United States Patent
Conti et al.

(10) Patent No.: US 8,004,835 B2
(45) Date of Patent: Aug. 23, 2011

(54) PORTABLE DATA TERMINAL INTERNAL SUPPORT STRUCTURE

(75) Inventors: Brian Vincent Conti, Matthews, NC (US); Larry Keith Hooks, Jr., Fort Mill, SC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 63 days.

(21) Appl. No.: 11/964,857

(22) Filed: Dec. 27, 2007

(65) Prior Publication Data

US 2009/0168337 A1 Jul. 2, 2009

(51) Int. Cl.
*G06F 1/16* (2006.01)
*H04M 1/00* (2006.01)

(52) U.S. Cl. ......... 361/679.56; 361/679.55; 361/679.57; 361/679.58; 455/575.1

(58) Field of Classification Search ........... 361/679.01–679.45, 679.55–679.59; 455/575.1
See application file for complete search history.

(56) References Cited

U.S. PATENT DOCUMENTS

| | | | |
|---|---|---|---|
| 5,917,176 A | 6/1999 | Bottazzi | |
| 5,987,205 A | 11/1999 | Moseley et al. | |
| 6,026,283 A * | 2/2000 | Stephenson | 455/575.1 |
| 6,229,695 B1 * | 5/2001 | Moon | 361/679.3 |
| 6,241,247 B1 | 6/2001 | Sternberg et al. | |
| 6,462,938 B1 * | 10/2002 | Horne et al. | 361/679.28 |
| 6,646,864 B2 * | 11/2003 | Richardson | 361/679.3 |
| 6,847,806 B2 * | 1/2005 | Curtis et al. | 455/90.3 |
| 6,876,543 B2 * | 4/2005 | Mockridge et al. | 455/347 |
| 6,913,201 B1 | 7/2005 | Wagner et al. | |
| 6,921,247 B2 | 7/2005 | Stewart et al. | |
| 7,092,520 B2 * | 8/2006 | Fuhrmann et al. | 379/433.11 |
| 7,104,212 B2 | 9/2006 | Brianza | |
| 7,116,780 B2 * | 10/2006 | Sun | 379/433.01 |
| 7,149,558 B2 * | 12/2006 | Kakuguchi et al. | 455/575.8 |
| 2003/0095374 A1 * | 5/2003 | Richardson | 361/681 |
| 2004/0127270 A1 * | 7/2004 | Wulff et al. | 455/575.4 |
| 2004/0253998 A1 * | 12/2004 | Dunleavy et al. | 455/575.1 |
| 2006/0054335 A1 * | 3/2006 | Rapp et al. | 174/48 |
| 2006/0281501 A1 * | 12/2006 | Zuo et al. | 455/575.1 |

* cited by examiner

*Primary Examiner* — Jayprakash N Gandhi
*Assistant Examiner* — Nidhi Desai
(74) *Attorney, Agent, or Firm* — Hiscock & Barclay, LLP

(57) ABSTRACT

A portable device assembly comprising a first housing portion defining a plurality of a snap retention features, a frame that supports electrical components, and a second housing portion secured to the frame with fasteners. The frame has a plurality of snap features that mate with the plurality of snap retention features so as to secure the frame to the first housing portion.

7 Claims, 8 Drawing Sheets

PORTABLE DATA TERMINAL INTERNAL SUPPORT STRUCTURE

BACKGROUND OF THE INVENTION

Portable data terminals (PDTs) are a type of data collection device used to collect, interpret, process, and ultimately transfer data to a larger data processing system. PDTs generally comprise a mobile computer, a keypad, and a data acquisition device. The mobile computer generally comprises a hand held (or "pocket") computing device, such as those available from INTEL, PALM, HEWLETT PACKARD, and DELL. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer. PDTs are available from several sources, including HAND HELD PRODUCTS, INC.

PDTs may be ruggedized for use in industrial environments. Such ruggedization may be varied depending on the intended environment—the tougher the environment, the tougher the PDT. For example, a light industrial PDT needs to be robust enough to continue functioning after numerous falls from a height of five feet or less. A major factor affecting the ruggedness of PDTs is how well the internal components are packed within the body of the device. To make a PDT more robust and resistant to damage, internal components such as circuit boards, keypads, and display screens must be packed and secured tightly inside the PDT.

Traditional plastic enclosures generally comprise at least two housing components. At least one of the housing components typically includes a series of molded bosses which may have screw inserts threaded therein. A screw is driven through an opening in one of the housing components into the molded boss or threaded insert thereof) of the other housing component. Issues commonly associated with this process include: ultrasonic assembly control issues, thermal assembly control issues, and insert assembly depth control, etc. . . . Such issues may lead to unsatisfactory performance, e.g. boss failure due to overstress, etc. . . . Furthermore, during assembly (including initial and any reassembly following repair activity) over torquing, boss strip, etc., are common.

Hence, there exists an unsatisfied need for a portable data terminal with a more rugged method of securing the PDT's internal components and a more rugged method of securing the PDT's housing by using a combination of securing methods.

BRIEF DESCRIPTION OF THE DRAWINGS

For the purpose of illustrating the invention, there is shown in the figures a form that is presently preferred; it being understood, however, that this invention is not limited to the precise arrangements and instrumentalities shown.

DETAILED DESCRIPTION

Figure 1:
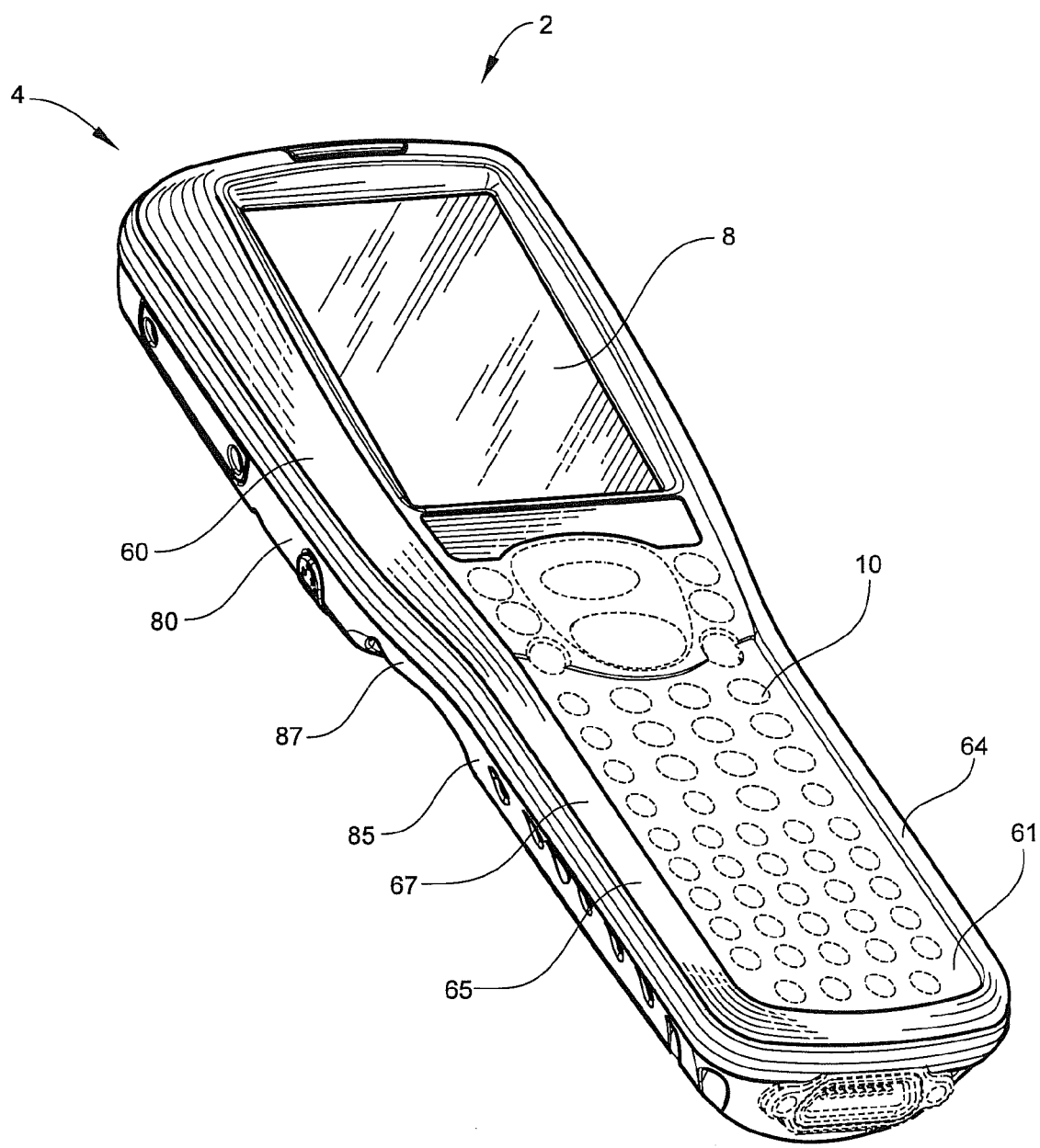
FIG. 1 is a perspective view of a portable device assembly.

Reference will now be made in detail to embodiments of the present invention, examples of which are illustrated in the accompanying drawings, wherein like numerals indicate like elements. The following description will use nomenclature associated with a PDT, however those of ordinary skill in the art will recognize that the present invention is applicable to a variety of other portable devices including, but not limited to, personal data assistants (PDAs), bar code scanners, consumer electronics (including portable radios, televisions, and phones), and the like. It is anticipated that many such portable devices would benefit from the present invention, including the embodiments thereof described herein.

FIGS. 1 through 8 collectively illustrate an embodiment of the present invention utilizing an internal frame with a combination of snap features and bosses to secure internal components within an upper and lower housing portion. The illustrated embodiment generally comprises an upper housing portion 60 secured to a lower housing portion 80 with a keyboard frame 20 and a system frame 40 secured there between. Generally, the lower housing portion 80 is secured with screws that pass through bosses in the lower housing portion and engage threaded inserts seated in reciprocal bosses in the upper housing portion 60, the keyboard frame 20 and the system frame 40.

During assembly, the keyboard frame is secured to the system frame 40 by, for example, screws. Subsequently, the keyboard frame 20 and the system fame 40 are snapped into the first housing portion through the use of snap features 36 and 56 located on the keyboard frame 20 and the system fame 40, respectively.

The keyboard frame 20 and the system frame 40 define screw holes 38 and 58, respectively. The screw holes 38 and 58 may be pre-threaded or smooth. The upper housing portion 60 contains molded bosses 70 with threaded inserts. The screw holes 38 and 58 and the molded bosses 70 facilitate mating the lower housing portion 80 with the upper housing portion 60. This combination of securing methods provides the strength benefit of a substantial snap design while allowing easy disassembly with a limited number of screws. It is to be noted that, the keyboard frame 20 and the system frame 40 secure additional components inside the unit, e.g. PCB stiffener, mounting frame, shielding, etc. . . . A more detailed description of various embodiments of the present invention follows.

Referring to FIGS. 1-4, housing 4, as used herein, refers to the outer case which contains and protects the internal components of a PDT. In one embodiment of the present invention, the housing 4 is comprised of a first housing portion 60 and a second housing portion 80 which are secured to one another by, for example, fasteners such as screws. In another embodiment, the housing 4 is comprised of one solid piece of material. In still another embodiment, the housing 4 is comprised of two or more pieces of material secured to one another.

Referring to FIGS. 1-4 there can be seen an embodiment of a first housing portion 60 and a second housing portion 80. The first housing portion 60 generally comprises a first base 61 (FIG. 1) and a plurality of first housing sides 65 (FIGS. 1, 4) emanating upward from the first base 61. The first base 61 has an interior surface 62 (FIG. 4) and an exterior surface 64 (FIG. 1). The first housing sides 65 (FIGS. 1, 4) have an interior surface 66 (FIG. 4) and an exterior surface 67 (FIG. 1). In one embodiment, the first housing portion 60 has a plurality of snap retention features 68 (FIG. 4) which are a part of or attached to the first housing portion 60. In another embodiment, the first housing portion 60 has a plurality of molded bosses 70 (FIG. 4) which are a part of, or attached to, the first housing portion 60. In still another embodiment, the first housing portion has a plurality of snap retention features 68 (FIG. 4) which are a part of or attached to the first housing portion 60 and a plurality of molded bosses 70 which are a part of or attached to the first housing portion 60. In still another embodiment, the first housing portion 60 has a plurality of molded bosses 70 with threaded inserts. In still another embodiment, the first housing portion 60 has a plurality of molded bosses 70 (FIG. 4) with associated screw wells through which screws are threaded.

Figure 2:
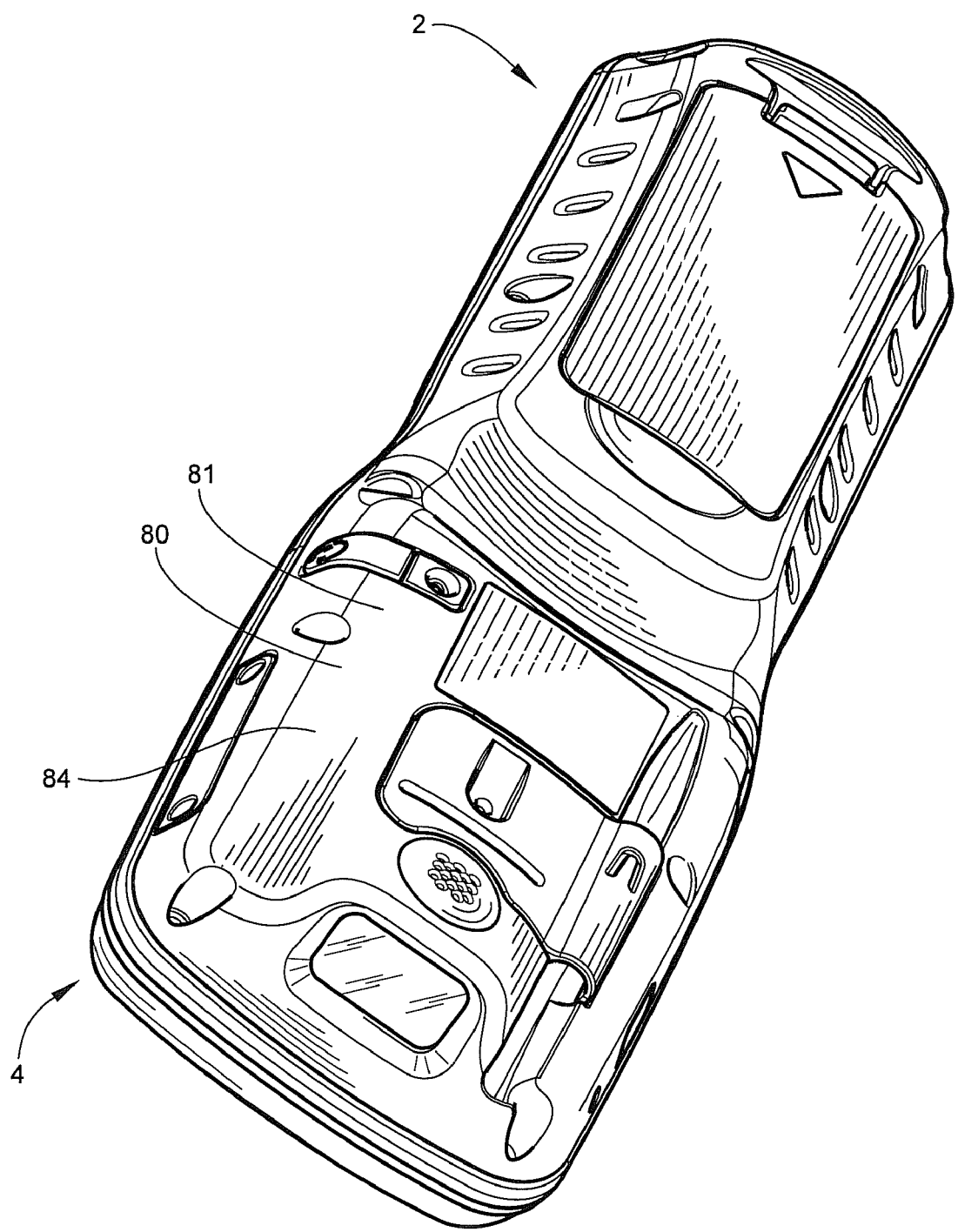
FIG. 2 is a perspective view of underside of a portable device assembly.
Figure 8:
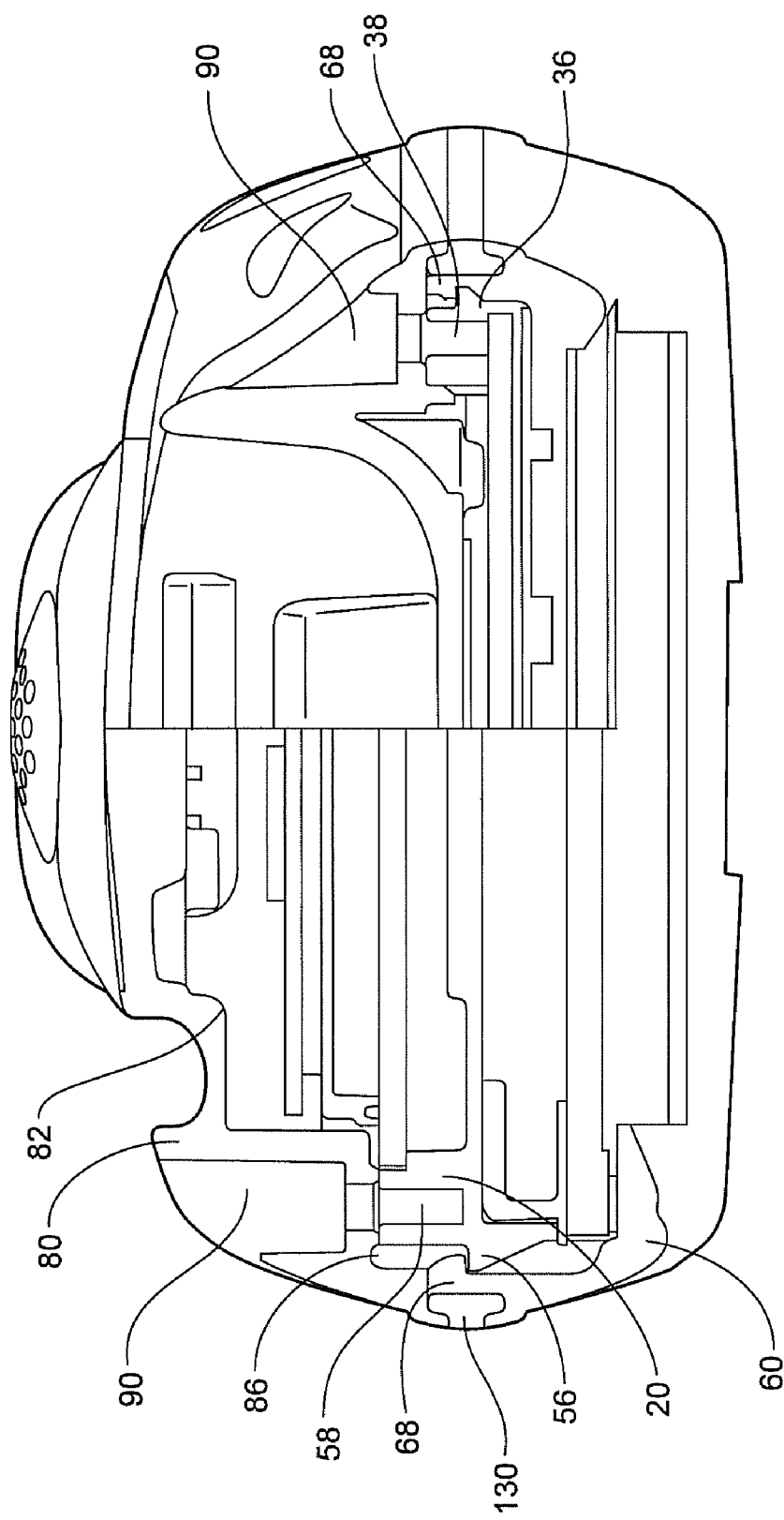
FIG. 8 is a cross section view of the portable device assembly.

Referring to FIGS. 1, 2, and 8, there can be seen an embodiment of a first housing portion 60 and a second housing portion 80. The second housing portion 80 generally comprises a second base 81 (FIG. 2) and a plurality of second housing sides 85 (FIG. 1) emanating upward from the second base 81. The second base 81 has an interior surface 82 (FIG. 8) and an exterior surface 84 (FIG. 2). The second housing sides 85 have an interior surface 86 (FIG. 8) and an exterior surface 87 (FIG. 1). In one embodiment, the second housing portion 80 has a plurality of snap retention features which are a part of or attached to the second housing portion 80. In another embodiment, the second housing portion 80 has a plurality of molded bosses 90 (FIG. 8) which are a part of or attached to the second housing portion 80. In still another embodiment, the second housing portion 80 has a plurality of snap retention features which are a part of or attached to the second housing portion 80 and a plurality of molded bosses 90 which are a part of or attached to the second housing portion 80. In still another embodiment, the second housing portion 80 has a plurality of molded bosses 90 (FIG. 8) with threaded inserts. In still another embodiment, the second housing portion 80 has a plurality of molded bosses 90 (FIG. 8) with associated screw wells through which screws are threaded.

The housing 4 may be comprised of any material durable enough to remain functionally intact after numerous falls from a height of five feet or less. Suitable housing 4 materials include, but are not limited to, metal, non-metal, or combinations thereof. Suitable metals include, but are not limited to, steel, carbon steel, aluminum, copper, nickel, tin, titanium, manganese, magnesium, beryllium, and combinations thereof. Suitable non-metals are generally polymers or plastics. Examples of plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. In one embodiment of the present invention, the housing 4 is made from polyethylene. In yet another embodiment, the housing 4 satisfies the requirements of the testing method MIL STD 810F, Method 516.5, Procedure IV, while encased within a housing 4. In still another embodiment, the housing 4 satisfies the requirements of the testing method MIL STD 810F, Method 516.5, Procedure IV, with the alteration of dropping the portable device assembly from a height of five feet (instead of four feet) approximately 24 times onto concrete. In still another embodiment, the portable device assembly 2 satisfies the requirements of the testing method MIL STD 810F, Method 516.5, Procedure IV, with the alteration of dropping the portable device assembly from a height of five feet (instead of four feet) approximately 24 times onto concrete.

Keyboard 10 (FIG. 3), as used herein, refers to an input device wherein information may be programmed into the PDT. In one embodiment, the keyboard 10 may also be referred to as a keypad. Keyboards 10 come in a variety of alpha-numeric and numeric configurations. Keyboard frame 20, as used herein, refers to a frame that supports and stabilized a keyboard 10 and is generally contained within the housing 4 of a portable device assembly 2.

Figure 3:
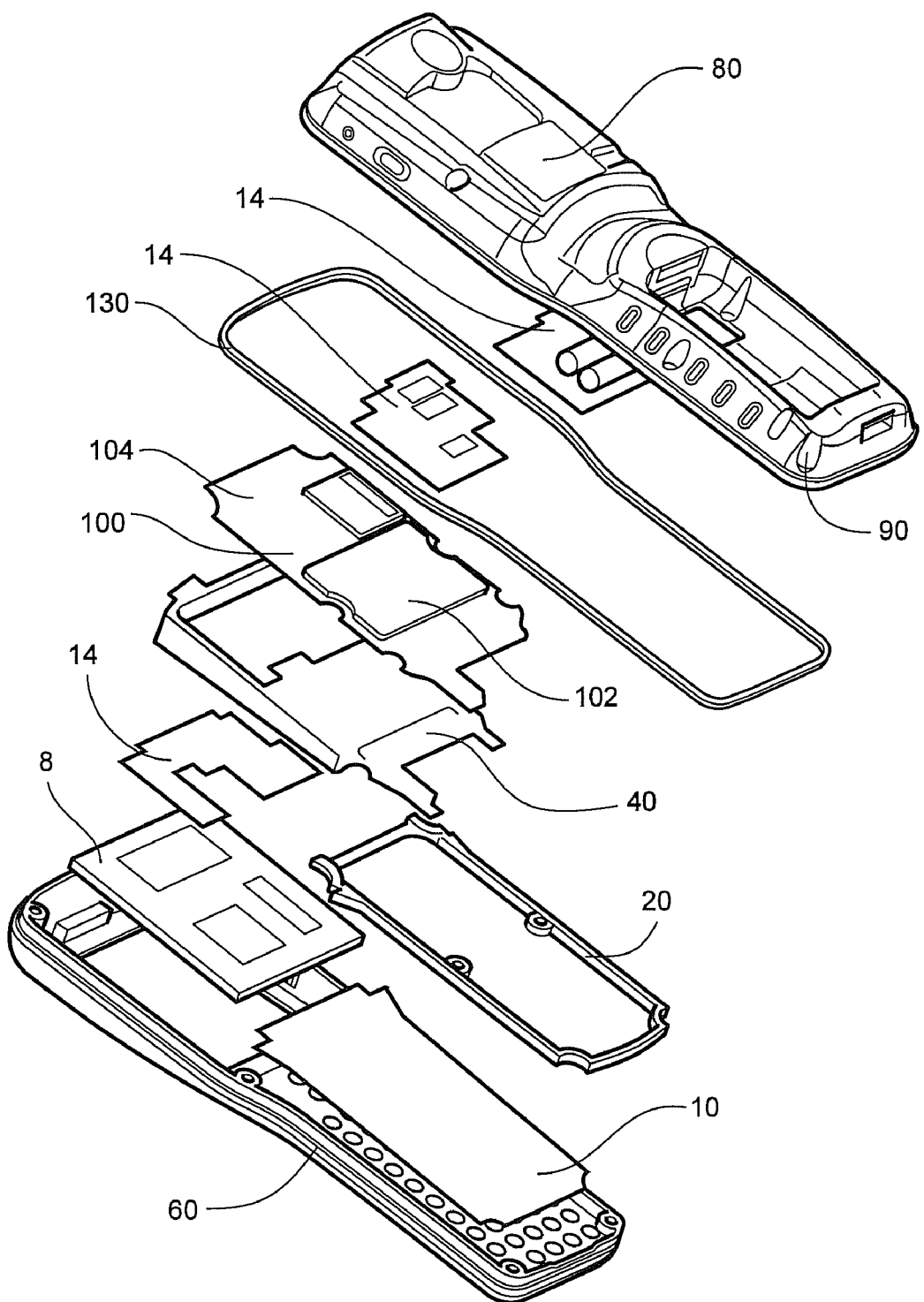
FIG. 3 is an exploded view of a portable device assembly.
Figure 4:
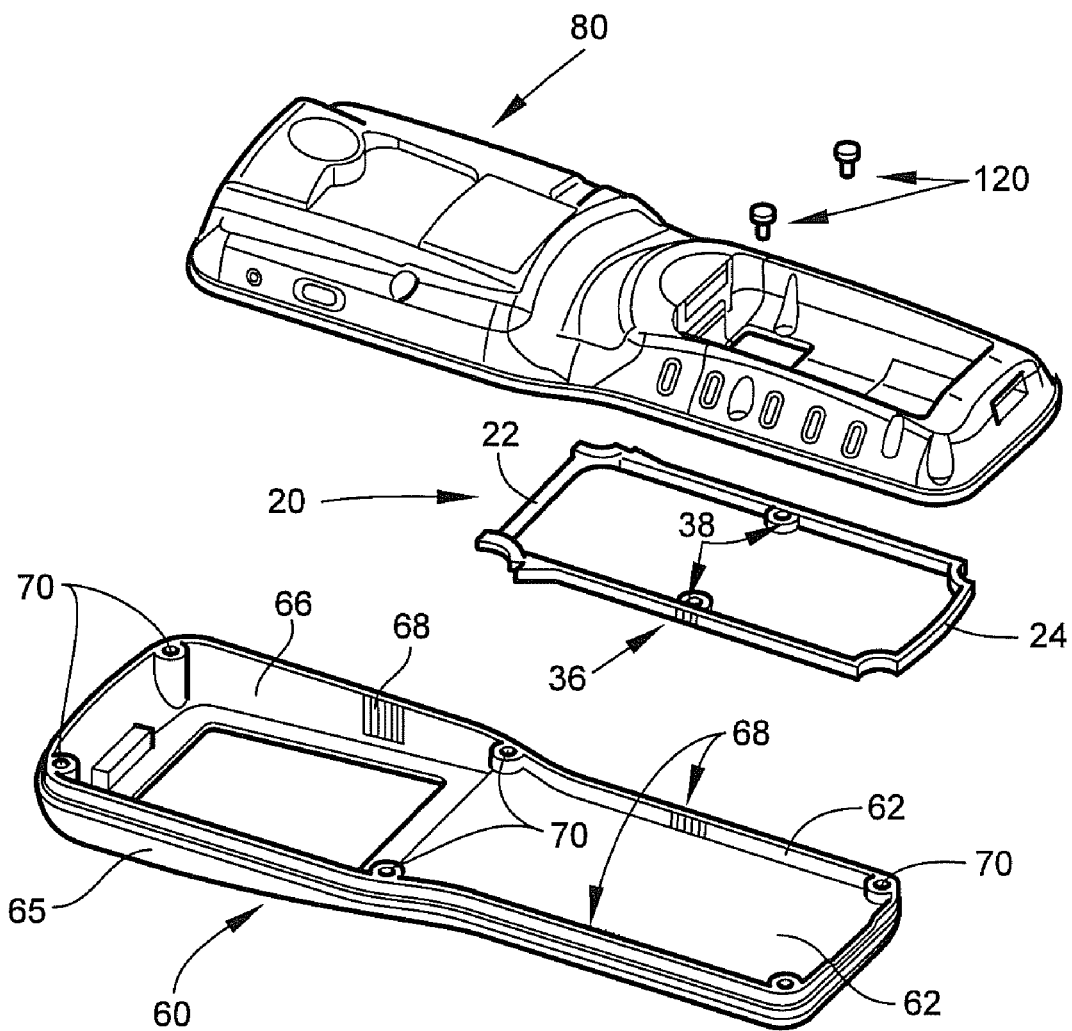
FIG. 4 is an exploded view of a portable device assembly.
Figure 5A:
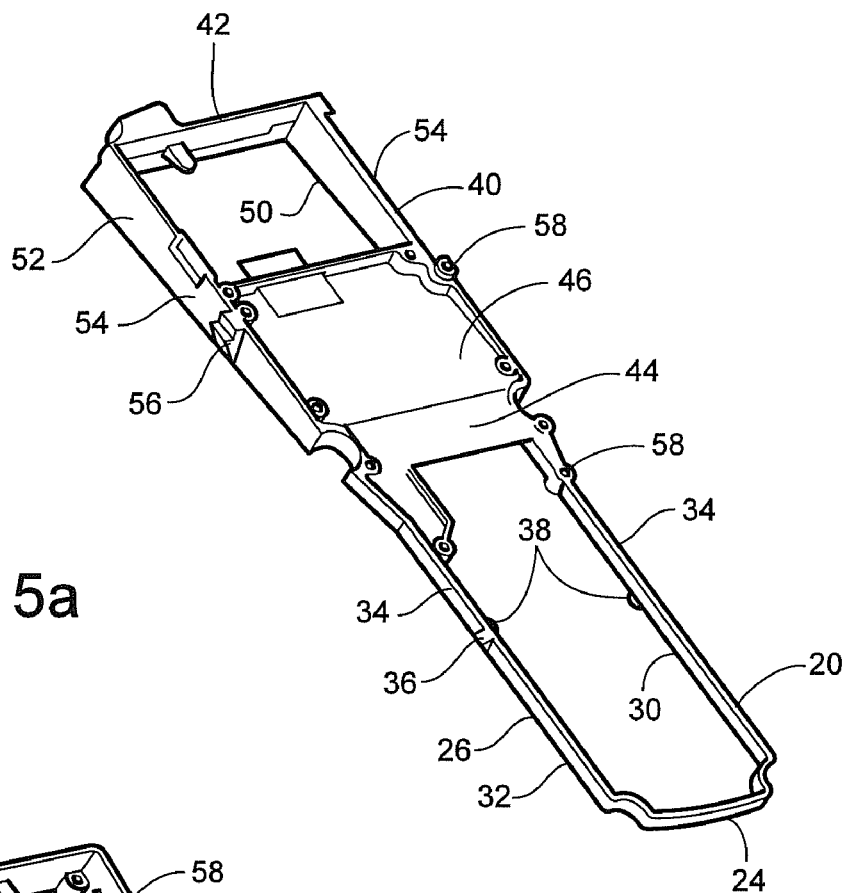
FIG. 5a is a perspective view of the keyboard frame and system frame.
Figure 5B:
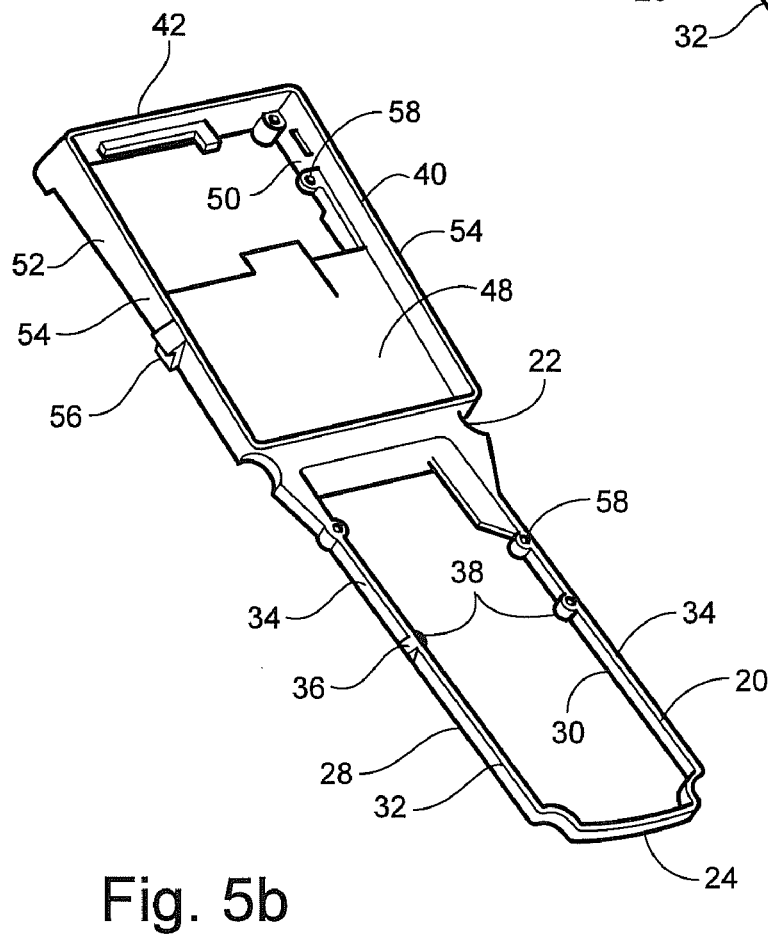
FIG. 5b is a perspective view of the keyboard frame and system frame.
Figure 6:
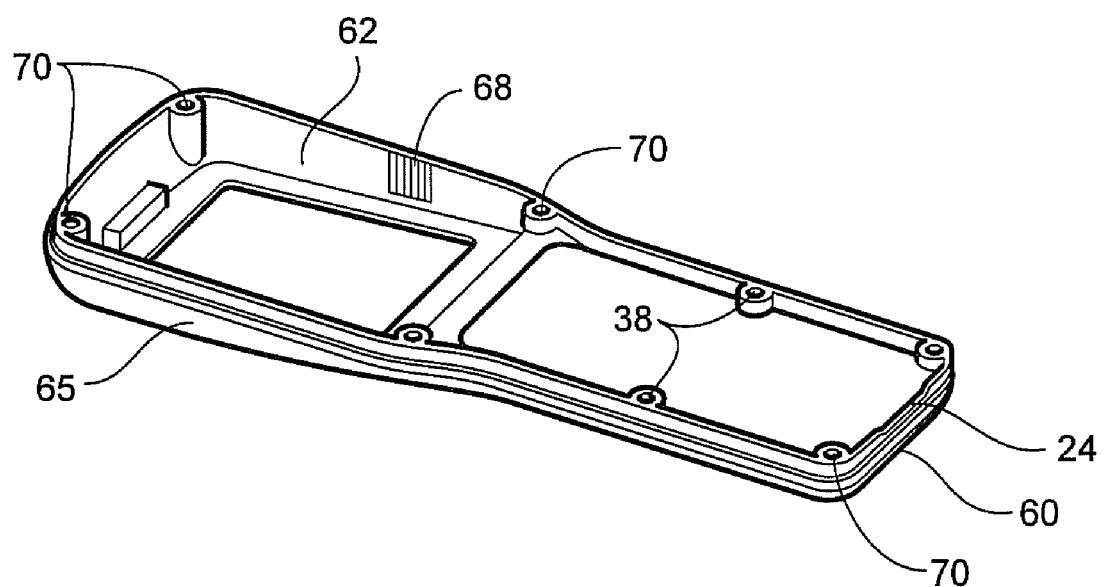
FIG. 6 is a perspective view of the first housing.

Looking to FIGS. 3-6, the keyboard frame 20 is comprised of a front end 22, a back end 24, and two or more sides 34 (FIGS. 4, 5a, and 5b). The keyboard frame 20 has a keyboard frame upper surface 26 (FIG. 5a), a keyboard frame lower surface 28 (FIG. 5b), a keyboard frame interior surface 30, and a keyboard frame exterior surface 32 (FIGS. 5a and 5b). In one embodiment, the keyboard frame 20 has a plurality of snap features 36 (FIGS. 4, 5a, and 5b) which are a part of or attached to the keyboard frame 20. In another embodiment, the keyboard frame 20 has a plurality of molded bosses and/or screw holes 38 which are a part of or attached to the keyboard frame 20 (FIGS. 4, 5a, 5b, and 6). In still another embodiment, the keyboard frame 20 has a plurality of snap features 36 which are a part of or attached to the keyboard frame 20 and a plurality of molded bosses and/or screw holes 38 which are a part of or attached to the keyboard frame 20 (FIGS. 4, 5a, and 5b). In yet another embodiment, the keyboard frame 20 may support and secure a keyboard 10 (FIG. 3) in addition to one or more additional electrical components 14. In another embodiment, the keyboard frame 20 may support and secure a keyboard 10, one or more printed circuit boards 100, and one or more electrical components 14 (FIG. 3). In still another embodiment, the keyboard frame 20 supports items including, but not limited to, a keyboard 10, electrical components 14, printed circuit boards 100, flex circuits, fasteners, or combinations thereof.

The keyboard frame 20 may be comprised of any material durable enough to remain functionally intact after numerous falls from a height of five feet or less. Suitable keyboard frame materials include, but are not limited to, metal, non-metal, or combinations thereof. Suitable metals include, but are not limited to, steel, carbon steel, aluminum, copper, nickel, tin, titanium, manganese, magnesium, beryllium, and combinations thereof. Suitable non-metals are generally polymers or plastics. Examples of plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. In one embodiment of the present invention, the keyboard frame 20 is made from magnesium. In yet another embodiment, the keyboard frame 20 satisfies the requirements of the testing method MIL STD 810F, Method 516.5, Procedure IV, while encased within a housing 4. In still another embodiment, a keyboard frame 20 satisfies the requirements of the testing method MIL STD 810F, Method 516.5, Procedure IV, with the alteration of dropping the portable device assembly from a height of five feet (instead of four feet) approximately 24 times onto concrete.

Still referring to FIGS. 3-6, system frame 40, as used herein, refers to a frame that supports and stabilizes the internal components of a PDT 2 and is generally contained within the housing 4 of a PDT 2. The system frame 40 is comprised of a front end 42, a back end 44, and two or more sides 54 (FIGS. 5a and 5b). The system frame 40 has a system frame upper surface 46 (FIG. 5a), a system frame lower surface 48 (FIG. 5b), a system frame interior surface 50, and a system frame exterior surface 52 (FIGS. 5a and 5b). In one embodiment, the system frame 40 may support and secure a display 8 (FIG. 3) in addition to one or more additional electrical components 14. In another embodiment, the system frame 40 may support and secure a display 8, one or more printed circuit boards 100, and one or more electrical components 14 (FIG. 3). In still another embodiment, the system frame 40 supports items including, but not limited to, a display 8, electrical components 14, printed circuit boards 100, flex circuits, fasteners, or combinations thereof. In yet another embodiment, the system frame 40 has a plurality of snap features 56 which are a part of or attached to the system frame 40 (FIGS. 5a and 5b). In another embodiment, the system frame 40 has a plurality of molded bosses and/or screw holes 58 which are a part of or attached to the system frame 40 (FIGS. 5a and 5b). In still another embodiment, the system frame 40 has a plurality of snap features 56 which are a part of or attached to the system frame 40 and a plurality of molded bosses and/or screw holes 58 which are a part of or attached to the system frame 40 (FIGS. 5a and 5b).

The system frame 40 may be comprised of any material durable enough to remain functionally intact after numerous falls from a height of five feet or less. Suitable system frame materials include, but are not limited to, metal, non-metal, or combinations thereof. Suitable metals include, but are not limited to, steel, carbon steel, aluminum, copper, nickel, tin, titanium, manganese, magnesium, beryllium, and combinations thereof. Suitable non-metals are generally polymers or plastics. Examples of plastics include, but are not limited to, polyethylene, polypropylene, polybutylene, polyethylene terephthalate, polycarbonate, poly vinyl chloride, and combinations thereof. If polyethylene or polypropylene is used, it is preferably a high density or an ultra high density polymer. In one embodiment of the present invention, the system frame 40 is made from magnesium. In yet another embodiment, the system frame 40 satisfies the requirements of the testing method MIL STD 810F, Method 516.5, Procedure IV, while encased within a housing 4. In still another embodiment, a system frame 40 satisfies the requirements of the testing method MIL STD 810F, Method 516.5, Procedure IV, with the alteration of dropping the portable device assembly from a height of five feet (instead of four feet) approximately 24 times onto concrete.

Printed circuit board 100 (FIG. 3), as used herein, refers to an electronic device used to mechanically support and electrically connect electronic components using conductive pathways, or traces, etched from copper sheets laminated onto a non-conductive substrate. The printed circuit board may be used alone, or populated with electronic components, such as those listed below.

Snap features, 36 and 56 (FIGS. 5a and 5b), and snap retention feature 68 (FIGS. 4 and 6), as used herein, refer to pairs of devices which lock together when engaged allowing very limited to no movement. In one embodiment of the present invention, snap retention features and snap features are formed or placed on various parts of a PDT and used to engage and secure two or more parts together during assembly of the PDT. In another embodiment, snap retention features and snap features are formed on the inside surface of the first and/or second housing portion of a PDT and are formed on the keyboard frame and system frame. The snap features of the keyboard frame 36 and system frame 56 are then engaged to the snap retention features of the first housing 68, second housing, or combination thereof, and secured within the housing 4 of a PDT. In still another embodiment, the snap retention features and snap features may take the form of mechanical interlocks.

Figure 7A:
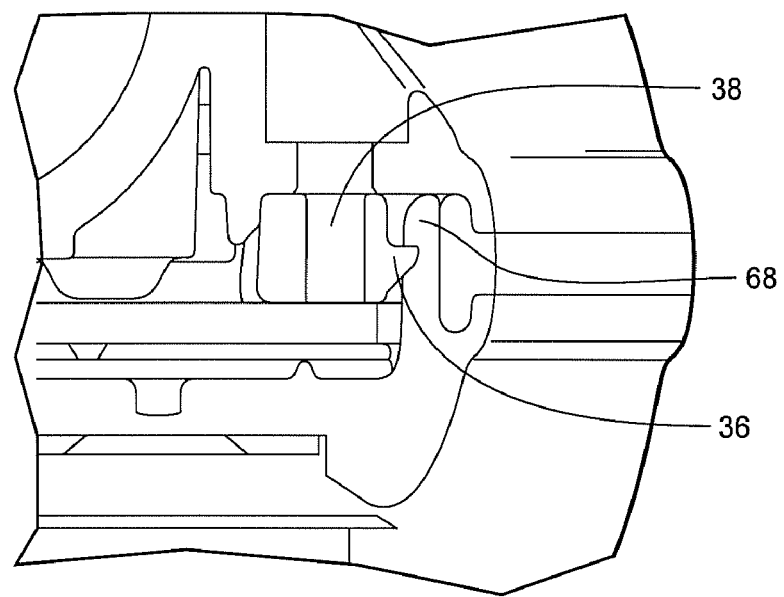
FIG. 7a is a cross section view of the portable device assembly.
Figure 7B:
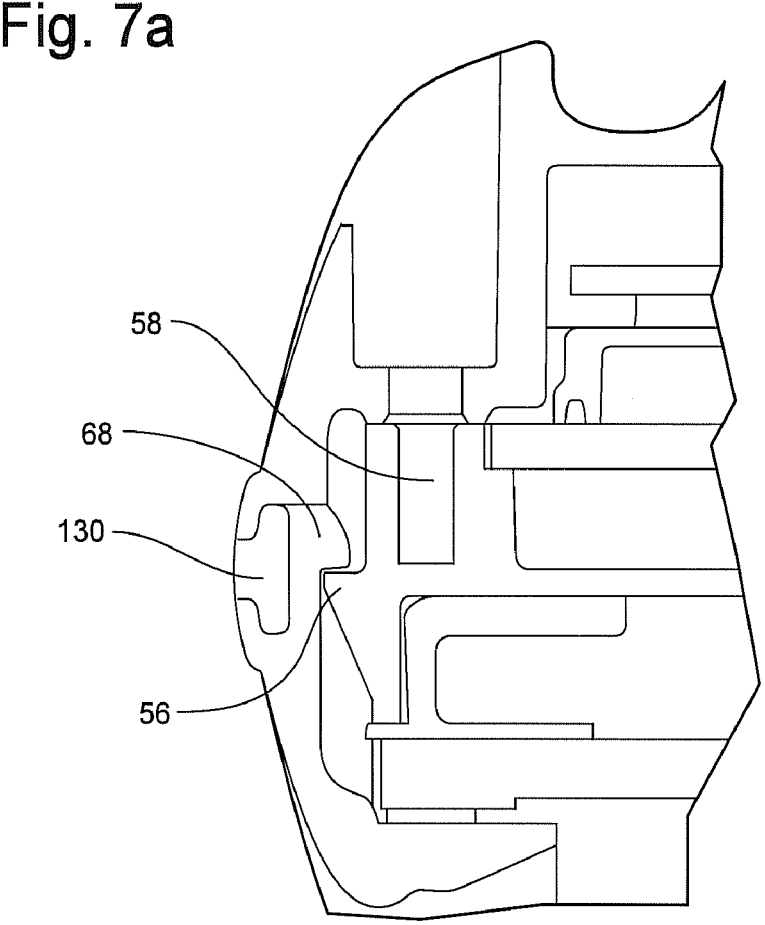
FIG. 7b is a cross section view of the portable device assembly.

Referring to FIGS. 7a, 7b, and 8, several embodiments of the snap retention features and snap features are illustrated. An embodiment of the a keyboard frame snap feature 36 engaging with a snap retention feature 68 is illustrated in FIGS. 7a and 8. FIGS. 7b and 8 illustrate an embodiment of a system frame snap feature 56 engaging with a snap retention feature 68. In another embodiment, a keyboard frame snap feature 36 or a system frame snap feature 56 may engage with a second housing snap retention feature in the same manner illustrated in FIGS. 7a, 7b, and 8.

Molded boss 38, 58, 70, and 90, as used herein, refers to a boss which emanates from a part of the PDT which include, but are not limited to, the first housing 70 (FIG. 6), the second housing 90 (FIG. 8), the keyboard frame 38 (FIGS. 5a and 5b), the system frame 58 (FIGS. 5a and 5b), a keyboard, a display, a circuit board, an electrical component, or combinations thereof. Molded bosses are molded out of the same material or a different material as the part from which they emanate. In one embodiment of the present invention, a plurality of molded bosses emanate from a plurality of parts of a PDT 2 which include, but are not limited to, the first base of the first housing 61, the second base of the second housing 81, the keyboard frame 20, the system frame 40, the keyboard 10, the display 8, one or more printed circuit boards 100, or combinations thereof. In another embodiment, the molded bosses emanate downwardly from the parts listed above. In yet another embodiment, the molded bosses may emanate in any direction from the parts listed above. The molded bosses may have a shape selected from the group consisting of rectangle, square, circle, semicircle, triangle, oblong, oval, tetrahedral, trapezoid, diamond, or combinations thereof.

The molded bosses may be used to secure the first housing portion 60 to the second housing portion 80. The molded bosses may be used to secure the keyboard frame to the second housing portion and/or first housing portion. The molded bosses may be used to secure the system frame to the second housing portion and/or first housing portion. In one embodiment of the present invention, the molded bosses are threaded to accept a threaded fastener such as a screw or bolt. In another embodiment of the present invention, the molded bosses are smooth to allow a fastener to pass through. In still another embodiment, a threaded insert is mounted within the molded boss and the threaded insert then accepts a threaded fastener such as a screw or bolt. Threaded holes, as used herein, refers to a molded boss, as described above, which has been threaded in order to accept a threaded fastener such as a screw or bolt.

Electrical components, as used herein, may include, but are not limited to, a display screen 8 (see FIG. 3), a printed circuit board 100, a keyboard 10, a flex circuit, a battery, a removable printed circuit board, an elongated electrical component, a wireless communication circuit, a terminal, a connector, a wire, a lead, a cord, a cable, a switch, a resistor, a capacitor, a fuse, an inductor, a power source, a transducer, a sensor, a detector, a network, a diode, a transistor, an integrated circuit, a hybrid circuit, an assembly, a module, a printed circuit board, or combinations thereof.

Fasteners 120 (see FIG. 4), as used herein, refers to a hardware device that mechanically joins or affixes two or more objects together. Examples of fasteners include, but are not limited to a bolt, a screw, a nail, a rivet, a spike, a staple, a dowel, a peg, a clip, a buckle, a button, a snap, a clasp, a pin, a tack, or a combination thereof.

Gasket 130 (FIGS. 3, 7b, and 8), as used herein, refers to a mechanical seal that fills the space between two objects, generally to prevent leakage between the two objects while under compression. The gasket may also be used to fill irregularities in an object. The gasket may be made from a material including, but not limited to, paper, gasket paper, rubber, silicone, metal, wood, felt, fiberglass, or a polymer such as polychloroprene. In one embodiment of the present invention, a gasket is used to close and seal the space between the first housing portion 60 and the second housing portion 80 to make the interface between the first housing portion and the second housing portion substantially waterproof.

Flex circuit, as used herein, refers to a flexible electrical circuit. The flex circuit may be flexible printed circuits made from etched foil conductor strands. The etched foil conductor strands are laminated between insulating layers. In one embodiment, a flex circuit is a single layer circuit. In another embodiment, a flex circuit is a multilayer circuit.

Threaded inserts, as used herein, refers to a device which may be inserted into a space in order to aid in securing two or more components together. The threaded insert may be threaded on its inside surface, its outside surface, or both. The threaded insert is designed to create greater clamping pressure between two or more components.

In one embodiment of the present invention there is described a portable device assembly 2 comprising a first housing portion 60 defining a plurality of snap retention features 68, a frame that supports electrical components 14, and a second housing portion 80 secured to the frame with fasteners. The frame has a plurality of snap features that mate with the plurality of snap retention features 68 so as to secure the frame to the first housing portion 60.

The embodiment described above may further include at least one of the first and second housing portions having molded bosses with threaded inserts. The other of the first and second housing portion has molded bosses with associated screw wells through which screws are threaded into the threaded insert so as to secure the first housing portion to the second housing potion.

The embodiments described above may further include a display screen supported by the frame wherein the first housing portion has an opening through which the display screen may be viewed. The embodiments described above may further include a keyboard supported by the frame wherein the first housing portion has at least one opening through which the keyboard may be utilized.

The embodiments described above may further include the frame having at least one screw hole and at least one of the first and second housing portions having molded bosses with associated screw wells through which screws are threaded into the screw holes so as to secure the housing portion to the frame.

The embodiments described above may further include a gasket engaging the first and second housing portions to make the interface between the first and second housing portions substantially waterproof. The embodiments described above may further include a flex circuit connecting two or more of the electrical components to one another.

FIGS. 3, 4, 5a, 5b, and 6 also illustrate an embodiment of the present invention wherein a portable device assembly 2 comprises a first housing portion 60 which has two or more snap retention features 68 (FIGS. 4 and 6) and a plurality of molded bosses 70, a keyboard 10, a keyboard frame 20 which has two or more snap features 36 (FIG. 4) and two or more screw holes 38 (FIGS. 4 and 6), a system frame 40 (FIG. 3) which has two or more snap features 56 (FIGS. 5a and 5b) and two or more screw holes 58 (FIG. 5a) and is engaged to the keyboard frame 20, a printed circuit board 100 (FIG. 3) which supports and interconnects a plurality of electrical components 14 (FIG. 3), and a second housing portion 80 which has a plurality of molded bosses 90 (FIG. 3). The keyboard frame snap features 36 and the system frame snap features 56 are engaged with the first housing snap retention features 68 allowing the keyboard frame 20 to maintain the keyboard 10 in a position relative to the first housing portion 60. The system frame 40 is engaged to a peripheral portion 104 of a first side 102 of the printed circuit board 100 (FIG. 3). The second housing portion 80 is engaged with the keyboard frame 20, the system frame 40, and the first housing portion 60 to enclose the PDT 2 and its components.

The embodiment described above may also include the keyboard frame 20 being engaged to the system frame 40 using one or more fasteners 120. In still another embodiment, the second housing portion 80 is engaged to the keyboard frame 20 and the system frame 40 using one or more fasteners 120. The embodiment previously listed may further include the second housing portion 80 being engaged to the first housing portion 60 using one or more fasteners 120. The snap retention features and snap features of the embodiments described above may take the form of mechanical interlocks.

The keyboard frame 20 and the system frame 40 described in the above embodiments are made from a metallic material. In one embodiment of the present invention, the keyboard frame 20 and the system frame 40 described in the above embodiments are made of a material selected from the group comprising: steel, carbon steel, aluminum, copper, nickel, tin, titanium, manganese, magnesium, beryllium, or combinations thereof. In another embodiment, the keyboard frame 20 and the system frame 40 are made of magnesium. In another embodiment, the first housing portion 60 and the second housing portion 80 are made from a polycarbonate material.

The embodiments described above may also include a gasket 130 engaged to both the first housing portion 60 and the second housing portion 80. The gasket 130 is made from a material selected from the group comprising: paper, rubber, silicone, metal, cork, felt, plastic, fiberglass, or combinations thereof. In one embodiment, the gasket is made of rubber.

The embodiments described above may also include a flex circuit 110 connecting one or more of a plurality of electrical components 14 to the keyboard 10. The flex circuit 110 is secured by, and passes between, the keyboard frame 20 and the system frame 40. The keyboard frame 20 and the system frame 40 are engaged to one another using one or more fasteners 120.

The embodiments described above may also include one or more threaded inserts secured within the first housing molded bosses 70, the second housing molded bosses 90, or combinations thereof. The second housing portion 80 is engaged to the keyboard frame 20, the system frame 40, and the first housing portion 60 using one or more fasteners. In one embodiment, the fasteners are screws and the screws pass through the plurality of second housing molded bosses 90 to engage with the first housing threaded inserts.

In one embodiment of the present invention, a portable device assembly 2 comprising: a first housing portion 60 comprising a first base 61 having an interior surface 62 and an exterior surface 64, and sides 65 emanating away from the first base 61, a keyboard 10, a keyboard frame 20 comprised of a front end 22, a back end 24, two or more keyboard frame sides 34, an upper surface 26, a lower surface 28, an interior surface 30, and an exterior surface 32, a system frame 40 engaged to the keyboard frame 20 using one or more fasteners 120, the system frame 40 is comprised of a front end 42, a back end 44, two or more keyboard frame sides 54, an upper surface 46, a lower surface 48, an interior surface 50, and an exterior surface 52 and is engaging a peripheral portion of a first side of a circuit board, the printed circuit board 100 supporting and interconnecting a plurality of electrical components 14, and a second housing portion 80 comprising a second base 81 having an interior surface 82 and an exterior surface 84, and sides 85 emanating up from the second base 81. The first housing sides 65 surround the interior surface of said first base 62 and have an interior surface 66 and an exterior surface 67. One or more snap retention features emanates from the interior surface of said first base 62 and/or the interior surface of the first housing sides 65. One or more molded bosses emanate from the interior surface of said first base 62 and/or the interior surface of the first housing sides 65. One or more snap features are formed on said exterior surface of the keyboard frame 32. One or more screw holes emanate inward from the interior surface of the keyboard frame 30. One or more screw holes located on the upper surface of the keyboard frame 26 in close proximity to the keyboard frame front end 22. One or more snap features are formed on the exterior surface of the system frame 52. One or more screw holes emanate inward from the interior surface of the system frame 50. One or more screw holes located on the upper surface of the system frame 46 in close proximity to the system frame back end 44. The keyboard frame snap features 36 and the system frame snap features 56 are engaged with the first housing snap retention features 68 maintaining the keyboard 10 in a position relative to the first housing portion 60. The second housing sides 85 surround the interior surface of the second base 82. The second housing sides 85 have an interior surface 82 and an exterior surface 84. One or more molded bosses emanate from said interior surface of the second base 82 and/or the interior surface of the sides 85. The second housing portion 80 is engaged with the keyboard frame 20, the system frame 40, and the first housing portion 60.

The embodiments described above may also include the second housing portion 80 being engaged to the keyboard frame 20 and the system frame 40 using one or more fasteners 120 passing through the second housing molded bosses 90 and engaging the keyboard frame screw holes 38 and the system frame screw holes 58. In still another embodiment, the second housing portion 80 is engaged to the first housing portion 60 using one or more fasteners 120 passing through the second housing molded bosses 90 and engaging the first housing molded bosses 70.

The embodiments described above may also include a flex circuit 110 connecting one or more of a plurality of electrical components 14 to the keyboard 10. The flex circuit 110 is secured by, and passes between, the keyboard frame 20 and the system frame 40 and the keyboard frame 20 and the system frame 40 are engaged to one another using one or more fasteners 120.

One embodiment of the present invention discloses a portable device assembly comprising a first housing portion defining a plurality of snap retention features, a keyboard frame that supports a keyboard, and a system frame that supports electrical components. The first housing portion has at least one opening through which the keyboard may be utilized. The keyboard frame and the system frame have a plurality of snap features and a plurality of screw holes. The system frame is engaged to the keyboard frame and the keyboard frame snap features and the system frame snap features are engaged with the snap retention features to secure the keyboard frame and the system frame to the first housing portion. A second housing portion has a plurality of molded bosses and is secured to the keyboard frame and the system frame with fasteners.

In another embodiment of the present invention, the keyboard frame is engaged to the system frame using one or more fasteners. In still another embodiment, the second housing portion being engaged to the keyboard frame, the system frame, and the first housing portion using one or more fasteners. In yet another embodiment, at least one of the first and second housing portions has molded bosses with threaded inserts and the other of the first and second housing portion has molded bosses with associated screw wells through which screws are threaded into the keyboard frame screw holes, the system frame screw holes, and the threaded insert so as to secure the first housing portion to the second housing portion with fasteners.

The embodiments described above may further include a display screen supported by the system frame wherein the first housing portion has an opening through which the display screen may be viewed. The embodiments described above may further include a gasket engaging the first housing portion and the second housing portion to make the interface between said first and second housing substantially waterproof. The gasket is made from a material selected from the group including, but not limited to, paper, rubber, silicone, metal, cork, felt, plastic, fiberglass, or combinations thereof. In one embodiment of the present invention, the gasket is made of rubber.

The embodiments described above may further include a flex circuit connecting one or more of the plurality of electrical components to the keyboard, where the flex circuit is secured by and passing between the keyboard frame and the system frame and the keyboard frame and the system frame are engaged to one another using one or more fasteners.

In one embodiment of the present invention, the snap retention features and snap features are mechanical interlocks. In another embodiment of the present invention, the keyboard frame and the system frame are metallic frames. In still another embodiment of the present invention, the keyboard frame and the system frame are made from magnesium.

Another embodiment includes a method for securing components in a portable device assembly 2 which is comprised of a series of steps. The steps include providing a first housing portion defining a plurality of snap retention features, followed by providing a system frame that supports electrical components, a plurality of screw holes, and also has a plurality of snap features that mate with the plurality of snap retention features. The steps continue by engaging the system frame snap features with the snap retention features so as to secure the system frame to the first housing portion. The steps continue further by providing a second housing portion and engaging the second housing portion to the system frame with screws.

The method described above may further include at least one of the first and second housing portions having molded bosses with threaded inserts and the other of the first and second housing portion having molded bosses with associated screw wells through which screws are threaded into the threaded insert so as to secure the first housing portion to the second housing potion. The method described above may further include at least one of the first and second housing portions having molded bosses with associated screw wells through which screws are threaded into the screw holes so as to secure the housing portion to the system frame.

The method described above may further include the steps of providing a keyboard and providing a keyboard frame that supports the keyboard wherein the keyboard frame has a plurality of snap features and a plurality of screw holes.

Engaging the keyboard frame to the system frame with fasteners passing through the keyboard frame screw holes and engaging the system frame screw holes followed by engaging the keyboard frame snap features with the snap retention features so as to secure the system frame to the first housing portion and engaging the second housing portion to the keyboard frame with screws.

The method described above may further include at least one of the first and second housing portions having molded bosses with threaded inserts wherein the other of the first and second housing portion having molded bosses with associated screw wells through which screws are threaded into the threaded insert so as to secure the first housing portion to the second housing potion. The method described above may further include at least one of the first and second housing portions having molded bosses with associated screw wells through which screws are threaded into the screw holes so as to secure the housing portion to the system frame and the keyboard frame.

Another embodiment includes a method for securing components in a portable device assembly 2 which is comprised of a series of steps. The steps include providing a first housing portion 60 having two or more snap retention features and a plurality of molded bosses, providing a keyboard 10, providing a keyboard frame 20 having two or more snap features and two or more screw holes, providing a printed circuit board 100 supporting and interconnecting a plurality of electrical components 14, providing a system frame 40 having two or more snap features and two or more screw holes. Engaging the keyboard frame 20 to the system frame 40 with fasteners 120 passing through the keyboard frame screw holes 38 and engaging the system frame screw holes 58. Engaging the keyboard frame snap features 36 and the system frame snap features 56 with the first housing snap retention features 68 allowing the keyboard frame 20 to maintain the keyboard 10 in a position relative to the first housing portion 60 and allowing the system frame 40 to engage a peripheral portion 104 of a first side 102 of the printed circuit board 100. Providing a second housing portion 80 having a plurality of molded bosses. Engaging the second housing portion 80 to the first housing portion 60 using fasteners 120 which pass through the second housing molded bosses 90 and engage the first housing molded bosses 70. In one embodiment of the above invention, the fasteners are screws.

Additional processes of the data may take place on the PDT 200 and/or a data processing source to which the data is transmitted via any available transport mechanism on the PDT 200. Some examples of known transport mechanisms utilized by PDT's include: Bluetooth, WiFi, GSM, CDMA, USB, IrDA, removable FLASH memory, parallel and serial ports (including for example, RS-232).

The PDT 2 may further include a plurality of wireless communication links such as an 802.11 communication link, an 802.16 communication link, a link for communication with a cellular network such as a network in accordance with the Global System for Mobil Communications (GSM), in IR communication link, and a Bluetooth communication link. Each of these links facilitates communication with a remote device and may be used to transfer and receive data.

The present invention may be embodied in other forms without departing from the spirit and the essential attributes thereof, and, accordingly, reference should be made to the appended claims, rather than to the forgoing specification, as indicated in the scope of the invention.

We claim:

1. A portable device assembly comprising:
a housing for containing electrical components comprising a first housing portion and a second housing portion;
said first housing portion defining a plurality of snap retention features;
a keyboard frame that supports a keyboard;
wherein said first housing portion has at least one opening through which said keyboard may be utilized;
said keyboard frame has a plurality of snap features and a plurality of screw holes;
a system frame that supports electrical components;
said system frame has a plurality of snap features and a plurality of screw holes;
said system frame is engaged to said keyboard frame;
said keyboard frame snap features and said system frame snap features are engaged with said snap retention features to secure said keyboard frame and said system frame to said first housing portion;
wherein one of said first or said second housing portion has a plurality of molded bosses with threaded inserts;
wherein said second housing portion is secured to said keyboard frame and, said system frame with fasteners,
wherein said first housing portion and said second housing portion encase said frame when said fasteners are fastened;
a flex circuit connecting two or more of said electrical components to one another;
a display screen supported by said system frame and wherein said first housing portion has an opening through which said display screen may be viewed;
wherein the other of said first and second housing portion has molded bosses with associated screw wells through which screws are threaded into said keyboard frame screw holes, said system frame screw holes, and said threaded insert so as to secure said first housing portion to said second housing portion.

2. The portable device assembly, as set forth in claim 1, where said snap retention features and snap features are mechanical interlocks.

3. The portable device assembly, as set forth in claim 1, where said keyboard frame and said system frame are metallic frames.

4. The portable device assembly, as set forth in claim 1, further comprising:
a gasket engaging said first housing portion and said second housing portion to make the interface between said first and second housing substantially waterproof;
said gasket is made from a material selected from the group comprising: paper, rubber, silicone, metal, cork, felt, plastic, fiberglass, or combinations thereof.

5. The portable device assembly, as set forth in claim 4, where said gasket is made of rubber.

6. The portable device assembly, as set forth in claim 1, further comprising:
wherein said flex circuit connecting one or more of said plurality of electrical components to said keyboard;
where said flex circuit is secured by and passing between said keyboard frame and said system frame;
where said keyboard frame and said system frame are engaged to one another using one or more fasteners.

7. A method of assembling a portable device assembly comprising the steps of:
providing a first housing portion defining a plurality of snap retention features;
providing a system frame that supports electrical components;

said system frame having a plurality of snap features that mate with said plurality of snap retention features and having a plurality of screw holes;

engaging said system frame snap features with said snap retention features so as to secure the system frame to the first housing portion;

providing a second housing portion;

engaging said first housing portion to said second housing portion with screws wherein at least one of said first and second housing portions having molded bosses with threaded inserts;

wherein the other of said first and second housing portion has molded bosses with associated screw wells through which screws are threaded into said threaded insert so as to secure said first housing portion to said second housing portion, wherein said first housing portion and said second housing portion encase said system frame when said fasteners are fastened;

providing a keyboard;

providing a keyboard frame that supports said keyboard;

said keyboard frame having a plurality of snap features and a plurality of screw holes;

engaging said keyboard frame to said system frame with fasteners passing through the keyboard frame screw holes and engaging the system frame screw holes;

engaging said keyboard frame snap features with said snap retention features so as to secure the keyboard frame to the first housing portion;

engaging said second housing portion to said keyboard frame with screws connecting one or more of said plurality of electrical components to said keyboard utilizing a flex circuit;

wherein said flex circuit is secured by and passing between said keyboard frame and said system frame.

* * * * *